UNITED STATES PATENT OFFICE.

JOHN W. SKELTON, OF DOUGLAS, ARIZONA.

BAIT FOR FLYTRAPS.

1,407,092.　　　　　Specification of Letters Patent.　　Patented Feb. 21, 1922.

No Drawing.　　　　Application filed April 29, 1920. Serial No. 377,551.

*To all whom it may concern:*

Be it known that I, JOHN W. SKELTON, a citizen of the United States, residing at Douglas, in the county of Cochise and State of Arizona, have invented certain new and useful Improvements in Baits for Flytraps, of which the following is a specification.

My present invention is a compound to be used as a lure for flies, the object of the invention being to provide a substance which will attract the flies and entice them into a trap or onto sticky fly-paper but will be non-poisonous so that it may be handled freely by any person.

In carrying out my invention, I mix three quarts of corn meal, one quart of wheat flour, one yeast cake, one pint of apple vinegar, and one pint of cane syrup. These ingredients are thoroughly commingled so as to form a good moist mixture and, after it has dried, two teaspoonfuls of baking powder are added and worked into and through the mass. The mixture is then put in packages of any desired character for the market.

When the bait is to be used, a quantity sufficient to supply the bait-holder is mixed with sufficient sweetened water to become plastic and cohesive, and this plastic cohesive body is placed on or in the bait-holder of a fly-trap or upon the surface of fly-paper.

The yeast and vinegar tend to give a sour odor which is attractive to flies and the syrup and sweetened water is also attractive to them so that a trap supplied with this bait will be quickly filled with the insects. The compound is very cheap and is easily manufactured and applied.

It will be understood that upon addition of water to the dry product, the acid contents of the product will re-act with the bicarbonate of soda in the baking powder to generate carbon dioxide gas. The generation of this gas will serve to disseminate or diffuse odors given off by the other ingredients thus adding greatly to the effectiveness of the composition as a lure.

Having thus described the invention, what is claimed as new is:

1. A non-poisonous insect lure consisting of a sour mash dried and mixed with bicarbonate of soda, whereby the addition of moisture produces a gas.

2. A non-poisonous insect lure consisting of a fermentable sour mash dried and mixed with bicarbonate of soda whereby the addition of moisture produces a gas.

3. A non-poisonous insect lure consisting of an acetic acid mash dried and mixed with bicarbonate of soda whereby the addition of moisture produces a gas.

In testimony whereof I affix my signature.

JOHN W. SKELTON. [L. S.]